US006683764B1

(12) United States Patent
Pniok

(10) Patent No.: US 6,683,764 B1
(45) Date of Patent: Jan. 27, 2004

(54) ARC EXTINGUISHING AID

(75) Inventor: Thomas Pniok, Hamburg (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/701,592

(22) PCT Filed: Mar. 31, 2000

(86) PCT No.: PCT/EP00/02914

§ 371 (c)(1), (2), (4) Date: Feb. 8, 2001

(87) PCT Pub. No.: WO00/65624

PCT Pub. Date: Nov. 2, 2000

(30) Foreign Application Priority Data

Mar. 31, 1999 (DE) ........................................ 199 14 773

(51) Int. Cl.[7] .................................................. H02H 3/00

(52) U.S. Cl. ................................. 361/2; 361/5; 361/12

(58) Field of Search ........................................ 361/2–14

(56) References Cited

U.S. PATENT DOCUMENTS 4,250,364 A * 2/1981 Kimblin et al. ............. 218/141
4,425,596 A * 1/1984 Satou ........................ 361/93.6
4,450,497 A * 5/1984 Bignell ........................ 361/80
5,598,311 A * 1/1997 Yang .......................... 361/106

* cited by examiner

*Primary Examiner*—Gregory J. Toatley, Jr.
*Assistant Examiner*—Isabel Rodriguez
(74) *Attorney, Agent, or Firm*—Cantor Colburn LLP

(57) ABSTRACT

The invention discloses an arc extinguishing aid with an externally powered magnetic blowout coil 3 for switching low currents in which the current direction in the externally powered magnetic blowout coil 3 is switched based on the detection of the current direction in the primary circuit of a DC power switch.

17 Claims, 3 Drawing Sheets

ARC EXTINGUISHING AID

BACKGROUND OF THE INVENTION

The present invention relates to an arc extinguishing aid with an externally powered magnetic blowout coil for switching low currents.

DC power switches such as tie circuit-breakers, section switches and rectifier switches are used for a variety of tasks in DC systems of electric railways etc., where a variety of requirement profiles are encountered with respect to carrying and switching in two current directions. Tie circuit-breakers must carry and switch currents in both directions, while section switches and rectifier switches may pass current in the direction opposite to the normal current direction during regeneration, and the switches must therefore be capable of switching certain current levels of up to 5 kA in both current directions.

In large DC power switches, extremely long turn-off times can occur during the switching of critical or low currents in the range from 0 to 400A. These extremely long turn-off times occur during switching via shunt trips in normal operation and cause a long arc lifetime, which in turn can cause severe wear in the contact system of the switching device, and damage the switching device itself.

The cause for the long turn-off times resides among other factors in the small electromagnetic force at low current which drives upward and elongates an arc resulting from a switching process. The arc can be viewed as a current-carrying conductor on which a force is exerted when a magnetic field is encountered. When the self-field of the current-carrying conductor is small, an external magnetic field can be applied to increase arc movement. This field can be implemented via magnetic blowout coils wired in series in a primary circuit, for example. These coils either pass the primary current continuously or during an extinguishing process, for example, when probes are connected to the primary circuit via coils.

However, these solutions have a disadvantage to the effect that the coils switched into the primary circuit must have a high current-carrying capacity and dynamic strength since the primary current pauses through them.

Other alternatives, e.g., a field implemented with the use of a permanent magnet or externally powered coils, can only be effective in one predefined current direction. In the opposite current direction, they would force the arc into the switch, thereby destroying the switch. However, since currents must be switched in both directions as discussed above, such alternatives are not suitable choices for solutions.

SUMMARY OF THE INVENTION

The above-described drawbacks and deficiencies of the prior art are overcome or alleviated by a coil that is powered by a control supply network and generates a magnetic field whose field lines penetrate that arc vertically and whose field direction is changed by the control unit based on the circuit for detection of the current direction. The magnetic field, in conjunction with the arc current, causes an elongation of the arc and drives it from the contacts into the arc chamber.

Advantageous embodiments of the invention are characterized in the dependent claims.

The magnitude of the magnetic field generated by the externally powered coil is independent of the current magnitude of the primary circuit. Consequently, when currents are very low, for example 1A, a sufficient magnetic field is available for the elongation. There is no need for coils that have a high short-term current carrying capacity and are expensive, and moreover, no thermal losses occur due to elements wired into the primary circuit.

The invention is described in greater detail below using an example embodiment and with reference to the drawings.

DETAILED DESCRIPTION OF THE DRAWINGS

An example embodiment of an arc extinguishing aid according to the invention for switching low currents is described in detail below with reference to FIGS. 1 through 3.

Figure 1:
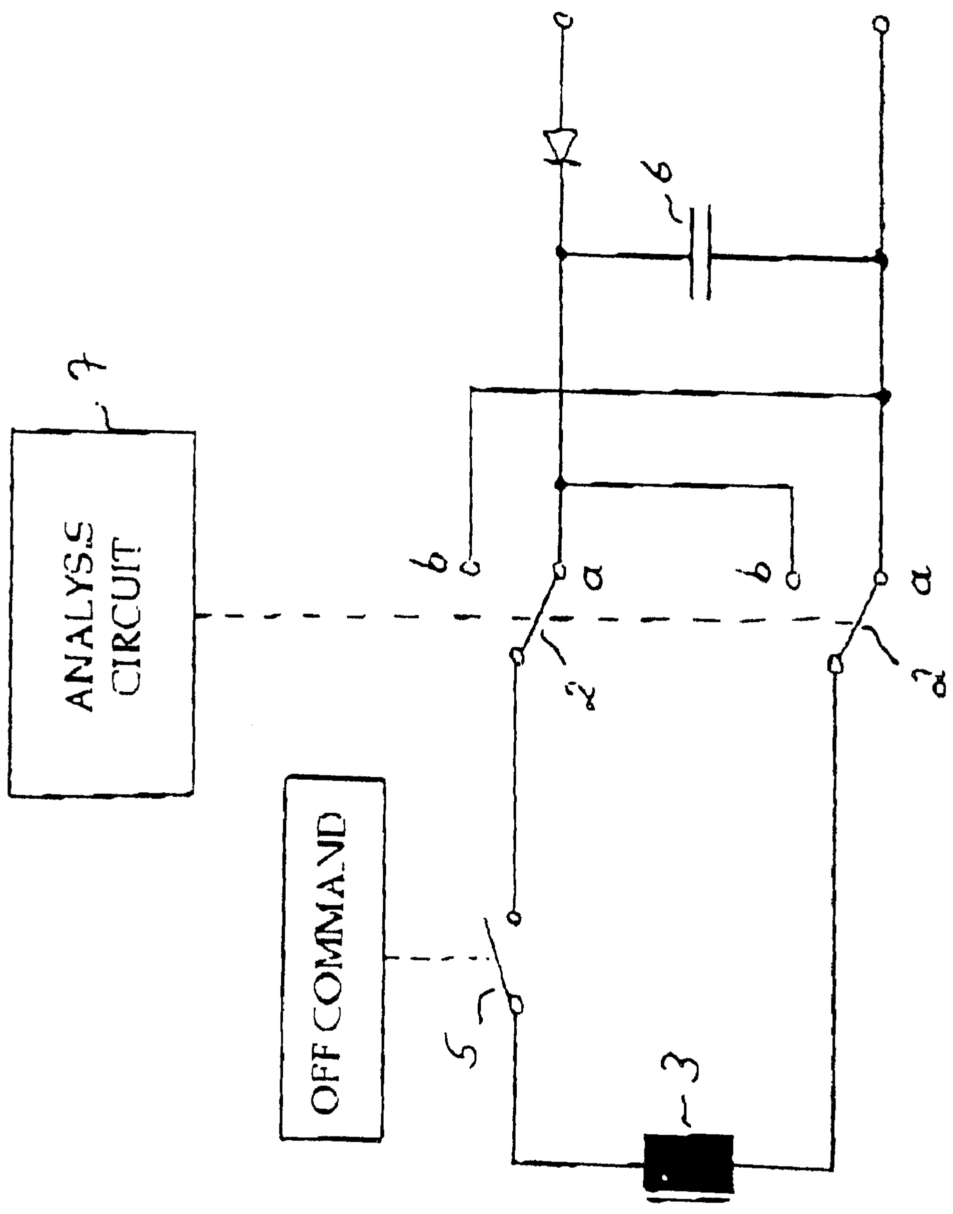
FIG. 1 shows a circuit arrangement for an arc extinguishing aid in accordance with an embodiment of the invention.

In FIG. 1, reference 2 designates a transfer switch or two way double-pole reversing switch 3, a magnetic blowout coil, 5 a switch, 6 a storage capacitor, and 7 an analysis circuit for switching the two-way double-pole reversing switch 2.

Figure 2:
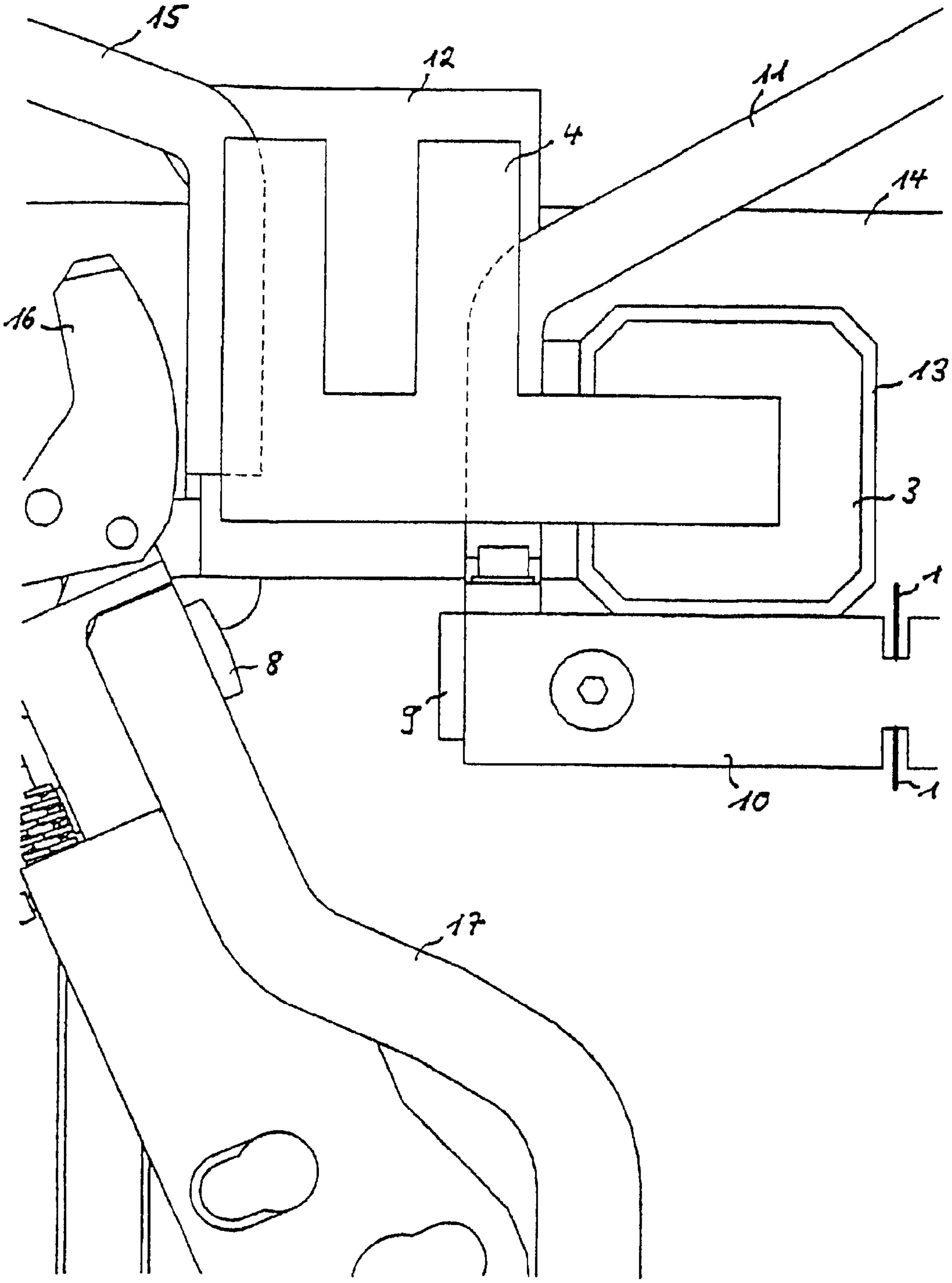
FIG. 2 shows a DC power switch in which the arc extinguishing aid in accordance with the embodiment of FIG. 1 may be used.

FIG. 2 shows Hall sensors 1, the magnetic blowout coil 3, a magnetic circuit 4, a movable contact piece 8 and a stationary contact piece 9 of a DC power switch, and an upper busbar 10 of the primary circuit. Reference 11 designates the fixed side of an arc guide, 12 an insulation of the magnetic core, 13 an insulation of the coil, 14 a side wall of an extinguishing plate arrangement 15 the movable side of the arc guide, 16 to a pilot contact and 17 a flexible lead of the DC power switch.

The sensitive Hall sensors 1 for detecting current direction are arranged in the primary circuits of the 1×$^{-}$ power switch in order to measure the current. To reduce interference, it is beneficial to position the Hall sensors 1 at a short distance from one another. To further increase immunity to interference, the two Hall sensors 1 are positioned in such a way that the usable fields of the two sensors are equal in magnitude but opposite in direction. Thus, interfering signals are filtered out during the subtraction of the signals from the Hall sensor 1 in the analysis circuit 7 described in detail below. Since the conductors in the primary current have a predetermined large cross-section due to their current-carrying capacity (several kA), the Hall sensors 1 can be recessed into the upper busbar 10 as shown in FIG. 2, thereby minimizing the size of the circuit.

Figure 3:
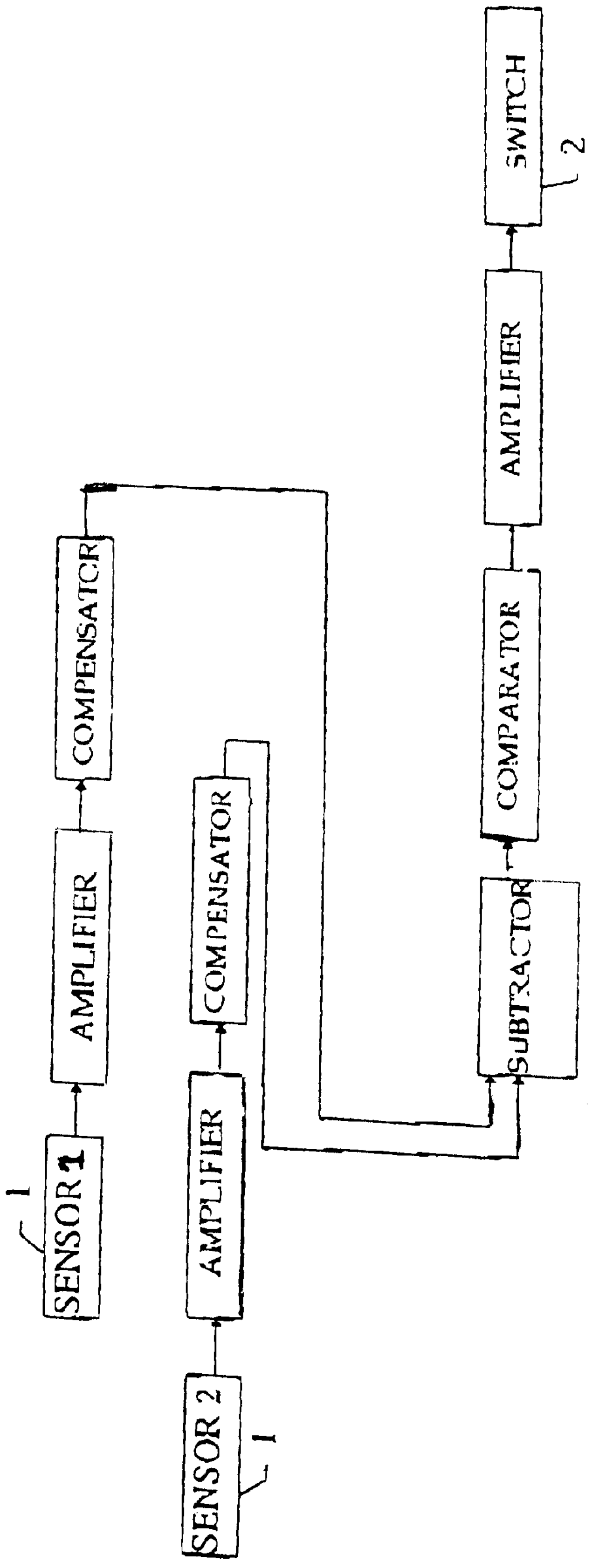
FIG. 3 shows a block diagram of the analysis circuit from FIG. 1.

FIG. 3 shows a block diagram of the analysis circuit 7. The analysis circuit 7 consists of the Hall sensors 1 and 2, which each have an amplifier and a compensator connected downstream of them. The output signals from the compensators are fed to a subtractor, which subtracts the signals and feeds them to a comparator. The comparator uses a threshold value to determine whether or not the signal it has received is greater than zero, and sends a signal corresponding to the result of this check to an amplifier downstream.

Hence, the amplifier emits a signal that is proportional to the measured current direction. This signal drives the two-way double-pole reversing switch 2, which changes the polarity or direction of current flow in the magnetic blowout coil 3 by changing over between contacts a and b in FIG. 3.

Thus, the analysis circuit 7 must be active prior to actuation of a shunt trip of the DC power switch in order to switch off. The analysis circuit 7 could however also become active upon a switchoff command if opening of the DC power switch occurs with a slight time delay for measuring the direction of the current.

When the shunt trip of the DC power switch is actuated, which is indicated by the "off command" box in FIG. 1, the switch b is closed in parallel thereto. In this way, discharging of the capacitor 6 through the magnetic blowout coil 3 is initiated. The magnetic field thereby produced in the coil is carried via the magnetic circuit 4 direction to the arc region on the contacts 8 and 9 of the DC power switch, more particularly to the base region of the arc. A variety of experiments have demonstrated that a magnetic field blewout in this region is extremely effective in accomplishing movement or travel of the arc.

The capacitor 6 also serves as a charge buffer that is charged when the switch 5 is open so that the system described above functions even in the event of failure of the auxiliary voltage or external power source.

Among the advantages of the invention are that the magnitude of the magnetic field generated by the magnetic blowout coil is independent of the magnitude of current in the primary circuit, and thus a sufficient magnetic field is available for the elongation even at very low currents, for example 1A. Moreover, there is no need for coils that must have a high short-term current carrying capacity (100000 A) and are expensive, nor do any thermal losses occur due to elements wired into the primary circuit.

In accordance with the invention, an arc extinguishing aid with an externally powered magnetic blowout coil for switching low currents is disclosed in which the current direction in the externally powered magnetic blowout coil is switched based on the detected current direction in the primary circuit of a DC power switch.

Various modifications in structure and/or steps and/or function may be made by one skilled in the art without departing from the scope of the invention.

What is claimed is:

1. A switch comprising:

a pair of contacts configured to interrupt flow of electrical current in a primary circuit; and an arc extinguishing aid configured to exert a magnetic force on an arc formed between the pair of contacts, the magnetic force having a magnitude sufficient to drive the arc away from the pair of contacts, and a direction of the magnetic force being selected in response to a direction of the flow of electrical current in the primary circuit.

2. The switch of claim 1, wherein the magnitude of the magnetic force is independent of a magnitude of the electrical current in the primary circuit.

3. The switch of claim 1, wherein the magnetic force is an electromagnetic force.

4. The switch of claim 3, wherein the arc extinguishing aid includes:

a detection device configured to detect the direction of the flow of electrical current in the primary circuit;

a coil configured to exert the electromagnetic force on the arc formed between the pair of contacts when an extinguishing circuit containing the coil is closed, and a switching device configured to switch the current direction in the extinguishing circuit in response to a signal supplied by the detection device.

5. The switch of claim 4, wherein the detection device includes two sensors and a subtractor for subtracting the output signals of the sensors.

6. The switch of claim 5, wherein the detection device further includes one amplifier and one compensator for the output signals of each sensor.

7. The switch of claim 5, wherein the detection device further includes a comparator for comparing the output signal of the subtractor to a threshold value, and an amplifier for amplifying the output signal of the comparator.

8. The switch of claim 5, wherein the sensors are Hall sensors that are recessed opposite one another into a conductor of the primary circuit.

9. The switch of claim 4, further comprising a capacitor which is switched in parallel to the circuit containing the coil and whose charge is not affected by the switching device.

10. A method for aiding arc extinguishing, the method comprising:

sensing a direction of current flow in a primary circuit to provide a sensed direction of current flow;

selecting a direction of a magnetic force in response to the sensed direction of current flow; and exerting the magnetic force on an arc formed between a pair of contacts in the primary circuit, the magnetic force having a magnitude sufficient to drive the arc away from the pair of contacts.

11. The method of claim 10, wherein the magnitude of the magnetic force is independent of a magnitude of the electrical current in the primary circuit.

12. The method of claim 10, wherein the magnetic force is an electromagnetic force.

13. The method of claim 12, wherein the selecting the direction of the magnetic force includes:

switching a current direction in an extinguishing circuit, the extinguishing circuit including a coil for exerting the magnetic force.

14. An arc extinguishing aid comprising:

means for sensing a direction of current flow in a primary circuit to provide a sensed direction of current flow;

means for selecting a direction of a magnetic force in response to the sensed direction of current flow; and means for exerting the magnetic force on an arc formed between a pair of contacts in the primary circuit, the magnetic force having a magnitude sufficient to drive the arc away from the pair of contacts.

15. The arc extinguishing aid of claim 14, wherein the magnitude of the magnetic force is independent of a magnitude of the electric current in the primary circuit.

16. The arc extinguishing aid of claim 16, wherein the magnetic force is an electromagnetic force.

17. The arc extinguishing aid of claim 16, wherein the means for selecting the direction of the magnetic force includes:

a switching device configured to switch the current direction in an extinguishing circuit; and wherein the means for exerting the magnetic force includes:

a coil disposed in the extinguishing circuit.

* * * * *